UNITED STATES PATENT OFFICE.

HANS T. CLARKE AND WILLIAM W. HARTMAN, OF ROCHESTER, NEW YORK, ASSIGNORS TO EASTMAN KODAK COMPANY, OF ROCHESTER, NEW YORK, A CORPORATION OF NEW YORK.

PROCESS OF MANUFACTURING ACETYL MONO-METHYL ARYL AMINES.

1,411,683.  Specification of Letters Patent.  Patented Apr. 4, 1922.

No Drawing.  Application filed January 8, 1921. Serial No. 435,973.

*To all whom it may concern:*

Be it known that we, HANS T. CLARKE and WILLIAM W. HARTMAN, a subject of the King of Great Britain and citizen of the United States of America, respectively, residing at Rochester, in the county of Monroe and State of New York, have invented certain new and useful Improvements in Processes of Manufacturing Acetyl Mono-Methyl Aryl Amines, of which the following is a full, clear, and exact specification.

This invention relates to a process of making acyl derivatives of mono-methyl aryl amines, of which methyl acetanilid is the most important commercially at the present time. One object of our invention is to provide a process which will be relatively inexpensive to carry out and yet will give high yields of the desired substances. Other objects will hereinafter appear.

It has been previously stated by Staedel, Berichte der Deutschen Chemischen Gesellschaft, volume 19, page 1947, that acetyl chloride at the usual temperature is without action on tertiary amines, whereas benzoyl chloride acts on dimethyl aniline, the latter statement being supported by a citation of Hess's work, same periodical, volume 18, page 685. Staedel also shows that acetyl bromide reacts with dimethyl aniline, so that monomethyl aniline can be produced, but explicitly says that this reaction constitutes a noteworthy difference between the bromide and chloride.

We have found, however, that methyl acetanilid (otherwise known as acetyl monomethyl anilin) and the analogous aryl amino substances, in which tolyl and naphthyl groups are present, may be prepared in yields closely approximating those that are theoretically possible if acetyl chloride be added to a boiling dimethyl aryl amine, such as dimethyl anilin, at a rate sufficiently slow to prevent the temperature of the boiling mixture falling below a critical temperature, which is 160° C., for example, when dimethyl anilin is employed. The re-action may be represented as follows:

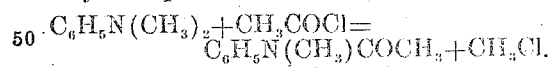

$$C_6H_5N(CH_3)_2 + CH_3COCl = C_6H_5N(CH_3)COCH_3 + CH_3Cl.$$

In general this critical temperature is well above the temperature at which an equimolecular mixture of the ingredients would boil under reflux conditions. Since the acetyl chloride is relatively much more volatile than the other ingredients, it seems probable that Hess's failure to obtain acetyl mono-methyl anilin was due to the fact that the temperature of his mixed substances never could pass the critical degree, owing to the physical laws governing the boiling of mixed liquids.

While the re-action between acetyl chloride and dimethyl anilin, when making methyl acetanilid, starts at about 160° C., the velocity of the re-action becomes much more convenient in the neighborhood of 190° C., and in the preferred embodiment of our invention we use a bath which is maintained at substantially that temperature, although the useful range in that neighborhood may extend down to, at least, 180° C. For example, the heated bath may be composed of dimethyl anilin or a mixture of dimethyl anilin and methyl acetanilid. Either of these baths will boil under reflux conditions at atmospheric pressure in the neighborhood of 190° C. To either of these baths acetyl chloride or a mixture (preferably equimolecular) of dimethyl anilin and acetyl chloride may be added, a small amount at a time, intermittently, or in a small continuous stream, at such a rate that the temperature does not fall much below 190° C. When an equimolecular mixture of acetyl chloride and dimethyl anilin is added to the bath, the latter may be composed almost entirely of methyl acetanilid. But this is not the preferred form. It is preferable to add the acetyl chloride or the mixture of this substance with dimethyl anilin under the surface of the bath, any of the well known means for making such addition being useful for this purpose. The boiling under reflux conditions is adequate to mix or agitate the liquids.

While we prefer to work at atmospheric pressure for convenience, nevertheless the pressure may be varied somewhat without preventing the desired re-action from taking place, the temperature being slightly altered by the change in pressure, as will be understood by those skilled in the art. Even when working at atmospheric pressure, the temperature may tend to rise somewhat owing to the formation of increasing amounts of the higher boiling methyl acetanilid in the bath. This increase does no harm. The methyl chloride formed during the re-action escapes through the condenser of the ordinary reflux apparatus, which may be employed, and may be recovered.

When sufficient methyl acetanilid has formed in the bath, the mixture is cooled and the methyl acetanilid, or acetyl mono-methyl anilin crystallizes out and may be freed from unchanged dimethyl anilin by filtration and washing with dilute acid or other known or preferred means.

By withdrawing part of the bath which is rich in methyl acetanilid and simultaneously adding an equivalent amount of dimethyl anilin to the bath, the latter may be kept continually in use. The dimethyl anilin thus added to the bath in the continuous form of our process may in part be composed of the dimethyl anilin, which is separate from the finished methyl acetanilid after proper purification.

Dimethyl toluidines or the corresponding naphthyl compounds may be used in place of the dimethyl anilin, as is obvious.

Having thus described our invention, what we claim as new and desire to secure by Letters Patent is:

1. The process of making acetyl mono-methyl aryl amines which comprises re-acting on a dimethyl aryl amine with acetyl chloride at a temperature above the temperature at which an equimolecular mixture of said ingredients would boil.

2. The process of making acetyl mono-methyl anilin which comprises re-acting on dimethyl anilin with acetyl chloride at a temperature above 160° C.

3. The process of making acetyl mono-methyl anilin which comprises re-acting on dimethyl anilin with acetyl chloride in the neighborhood of 190° C.

4. The process of making acetyl mono-methyl anilin which comprises adding acetyl chloride to a heated bath containing dimethyl anilin at such a rate that the temperature of the bath does not fall below 160° C.

5. The method of making acetyl mono-methyl acetanilid which comprises adding acetyl chloride to a boiling bath containing dimethyl anilin while maintaining the temperature of the bath in the neighboorhood of 190° C.

6. The process of making an acetyl mono-methyl aryl amine which comprises adding acetyl chloride to a heated bath containing a dimethyl aryl amine at such a rate that the temperature of the bath does not fall below a re-action temperature above the temperature at which an equimolecular mixture of such ingredients would boil, the aryl group in said dimethyl aryl amine being the same as the aryl group in said derived acetyl mono-methyl aryl amine.

7. The process of making acetyl mono-methyl anilin which comprises adding acetyl chloride to a boiling bath, under reflux conditions, containing dimethyl anilin while maintaining the temperature of said bath at approximately 190° C.

8. The process of making acetyl mono-methyl anilin which comprises adding acetyl chloride below the surface of a boiling bath containing dimethyl anilin while maintaining the temperature of said bath at approximately 190° C.

9. The process of producing acetyl mono-methyl anilin, which comprises adding acetyl chloride below the surface of a boiling bath, under reflux conditions, containing dimethyl anilin while maintaining the temperature of the bath in the neighborhood of 190° C., and finally cooling the resulting mixture to crystallize the acetyl mono-methyl anilin thus produced.

10. The process of making acetyl mono-methyl anilin, which comprises adding acetyl chloride to a heated bath containing dimethyl anilin and acetyl mono-methyl anilin while maintaining the temperature of the bath above 160° C.

11. The process of making acetyl mono-methyl anilin, which comprises adding a mixture of acetyl chloride and dimethyl anilin to a bath which is maintained at a temperature above 160° C.

12. The process of making acetyl mono-methyl anilin, which comprises adding an equimolecular mixture of acetyl chloride with dimethyl anilin to a boiling bath containing dimethyl anilin and acetyl mono-methyl anilin.

Signed at Rochester, New York, this 3rd day of January, 1921.

HANS T. CLARKE.
WILLIAM W. HARTMAN.